(12) United States Patent
Schulz et al.

(10) Patent No.: US 10,465,727 B2
(45) Date of Patent: Nov. 5, 2019

(54) FASTENER DEVICE

(71) Applicant: A. Raymond Et Cie. SCS, Grenoble (FR)

(72) Inventors: Stefan Schulz, Lörrach (DE); Melanie Anna, Hausen (DE); Virginie Pouzols, Huningue (FR); Richard Geist, Southfield, MI (US)

(73) Assignee: A. Raymond Et Cie, Grenoble (FR)

( * ) Notice: Subject to any disclaimer, the term of this patent is extended or adjusted under 35 U.S.C. 154(b) by 200 days.

(21) Appl. No.: 15/566,389

(22) PCT Filed: Apr. 13, 2016

(86) PCT No.: PCT/EP2016/000605
§ 371 (c)(1),
(2) Date: Oct. 13, 2017

(87) PCT Pub. No.: WO2016/165823
PCT Pub. Date: Oct. 20, 2016

(65) Prior Publication Data
US 2018/0313381 A1 Nov. 1, 2018

(30) Foreign Application Priority Data
Apr. 13, 2015 (DE) .................. 10 2015 004 515

(51) Int. Cl.
*F16B 2/14* (2006.01)
*F16B 5/06* (2006.01)
(Continued)

(52) U.S. Cl.
CPC .............. *F16B 5/0642* (2013.01); *F16B 2/14* (2013.01); *F16B 21/02* (2013.01); *F16B 21/086* (2013.01);
(Continued)

(58) Field of Classification Search
CPC .......... F16B 21/086; F16B 21/02; F16B 2/14; F16B 5/0642; F16B 43/009; Y10T 29/4995; Y10T 29/49952
(Continued)

(56) References Cited

U.S. PATENT DOCUMENTS 7,168,902 B2 * 1/2007 Terry ...................... F16B 31/04
411/149
8,579,572 B1 * 11/2013 Psimas .................. F16B 43/009
411/535

(Continued)

FOREIGN PATENT DOCUMENTS

CN          1427927 A     7/2003
CN       101086272 A    12/2007
(Continued)

*Primary Examiner* — Bayan Salone
(74) *Attorney, Agent, or Firm* — Warner Norcross & Judd LLP

(57) ABSTRACT

The invention relates to an attachment device with a fastener, a first supporting disk and a second supporting disk, wherein the fastener has a head with a head contact surface and a pin extending out along a longitudinal axis, wherein the pin has an attachment end with a contact surface that is opposite the head contact surface. The first supporting disk has a suitably large opening to permit the pin to pass through the opening, and has a wedge-shaped section. The second supporting disk has a suitably large opening to permit the pin to pass through the opening and to permit the second supporting disk to turn relative to the fastener about the longitudinal axis of the pin. The second supporting disk is in contact with the wedge-shaped section and moves along the surface of the wedge-shaped section, when the second supporting disk and the fastener turn relative to each other about the longitudinal axis of the pin.

20 Claims, 7 Drawing Sheets

(51) Int. Cl.
*F16B 21/02* (2006.01)
*F16B 21/08* (2006.01)
*F16B 43/00* (2006.01)

(52) U.S. Cl.
CPC ......... *F16B 43/009* (2013.01); *Y10T 29/4995* (2015.01)

(58) Field of Classification Search
USPC ...... G9B/5, 5.147, 5.181, 5.182, 25, 25.002, G9B/25.003; 73/9; 360/69, 75, 88, 360/97.06, 97.11, 99.01, 99.02, 99.06
See application file for complete search history.

(56) References Cited

U.S. PATENT DOCUMENTS

| | | | | |
|---|---|---|---|---|
| 9,009,928 | B2* | 4/2015 | Binkert | F16B 2/243 24/293 |
| 2010/0272540 | A1* | 10/2010 | Bucker | F16B 21/02 411/549 |
| 2012/0301218 | A1* | 11/2012 | De Jong | F16B 21/07 403/326 |
| 2013/0302087 | A1* | 11/2013 | Binkert | F16B 2/243 403/345 |
| 2014/0037399 | A1* | 2/2014 | Hyatt | F16B 39/282 411/87 |
| 2014/0109357 | A1* | 4/2014 | Fischer | F16B 2/243 24/455 |

FOREIGN PATENT DOCUMENTS

| | | |
|---|---|---|
| CN | 101963184 A | 2/2011 |
| CN | 203009535 U | 6/2013 |
| CN | 103348145 A | 10/2013 |
| DE | 53811 | 10/1890 |
| DE | 1423866 U | 4/1937 |
| DE | 2728133 A1 | 5/1979 |
| DE | 3706389 01 | 4/1988 |
| DE | 202005010873 U1 | 9/2005 |
| DE | 102006003471 A1 | 8/2007 |
| WO | 2012104250 | 8/2012 |

* cited by examiner

FASTENER DEVICE

TECHNICAL FIELD OF THE INVENTION

The invention relates to an attachment device with a fastener, which has a head with a head contact surface and a pin extending from the head along a longitudinal axis, with the pin having an attachment end with a contact surface that is opposite the head contact surface,

BACKGROUND OF THE INVENTION

As attachment devices, screws are known with nuts screwed onto a threaded pin of the screw, and screws that are screwed into a threaded borehole. The connecting parts to be attached to each other are arranged between the screw head and the nut screwed on to the threaded pin. However, screw connections have a drawback in that they require a relatively time-consuming attachment process. Thus, for example a screw has to be turned multiple times until it is screwed in far enough. With through screws it is necessary to provide the pin end with a nut, and for pin screws often the other pin end also. When there is a plurality of screw connections, the cumulative assembly time is enormous.

Additionally, clips are known as generic attachment devices. These have a fastener with a head with a head contact surface. A pin extends out from the head along a longitudinal axis. The pin has an attachment end with a contact surface, which lies opposite the head contact surface. The connection parts to be connected with the attachment device are arranged between the head contact surface and the contact surface of the pin, with the pin engaging into openings made in the connecting pieces. With this, provision is made that the contact surface is configured on a spring-loaded element of the pin. Spring force puts tension on the element away from the longitudinal axis of the pin. This makes it possible to guide the pin of the connector through the openings of the connection pieces, with the spring-loaded element moving against the spring force to the longitudinal axis of the pin, thus reducing the circumference of the pin. After passing through the opening, the spring-loaded element moves back into its original setting, thereby expanding the circumference of the pin. By this means the pin is prevented from being able to be pulled back through the opening. What is disadvantageous with such an attachment device is that the distance between the head contact surface and the contact surface in the initial setting of the spring-loaded element is preset in fixed fashion and thus the connection force acting on the connecting pieces to be joined is preset in fixed fashion.

BRIEF SUMMARY OF THE INVENTION

The object of the present invention therefore is to propose a generic attachment device in which the connection force to be exerted on the connecting parts to be joined can be adjusted.

The object is achieved by the subject of claim 1 and of claim 6. Advantageous embodiments are indicated in the subordinate claims and in the specification.

In a first version, the core of the invention makes provision that two supporting disks are turned relative to each other, wherein at least one supporting disk has a partial cross section that is wedge-shaped, over which the other supporting disk moves, thus increasing the distance between the surfaces pointing away from each other and thereby the distance between the supporting disk closest to the pin end and the contact surface is reduced. The connecting parts are arranged between the supporting disk closest to the pin and the contact surface, so that reducing the distance between this supporting disk and the contact surface increases the connection force applied to the connecting parts.

In one embodiment, provision is made that the one supporting disk is provided to be turned relative to the fastener about the longitudinal axis of the pin, while the other supporting disk is not provided to be turned about the longitudinal axis of the pin. With this, the supporting disk provided for the relative turning motion can be the one that is closest to the attachment end, or the one that is closest to the head. Alternatively, it is also conceivable that both supporting disks turn in opposite rotational directions. In one preferred embodiment, the supporting disk that is closest to the head (the second supporting disk) turns, and the supporting disk that is closest to the pin end (the first supporting disk) does not turn.

In one preferred embodiment, torque is introduced via the supporting disk provided for the relative motion. For this, the supporting disk to be turned, in a preferred embodiment, can be specially configured, for example have a hexagonal outer contour, onto which a tool can engage.

In one alternative embodiment, the torque is introduced via the head, so that it and the pin provided on it turn relative to a supporting disk, while the other supporting disk is connected so as not to turn with the pin, and turns with it.

In one preferred embodiment, the head contact surface and the longitudinal axis of the pin are aligned perpendicular to each other. Preferably the head contact surface consists of multiple surface components which, especially preferred, lie in a single plane. In an especially preferred embodiment form, the head contact surface consists of two surface parts, which are at the same distance from the longitudinal axis and are offset to each other by 180°. The surface parts preferably are of the same shape, with a rectangular or square shape being preferred.

The head can have any shape suitable for implementation of the invention, such as the shape of a disk or of a screw head, such as a hex screw or a hammerhead screw or a shape similar to these shapes. It is especially preferred for the head to have a cuboid design, or to have an essentially cuboid sheath, and an elongated cuboid is particularly preferred.

The attachment device can consist partially or wholly of plastic, metals or other materials. Advantageously, elastic materials can be effective, especially as materials for the wedge-shaped sections of the supporting disks, since these, when the desired distances or desired connection force is set, permit greater play.

In one preferred embodiment, the second supporting disk has a wedge-shaped section and the wedge-shaped section of the second supporting disk makes contact with the wedge-shaped section of the first supporting disk. By this means, two wedge-shaped sections can be moved over each other, which leads to a simple and regular adjustment of the distance between the supporting disks and thus of the distance between the supporting disk closest to the pin end and the contact surface. This it also becomes possible that the connection force acting on the connecting pieces to be joined can be adjusted in a narrow range, which can be advantageous especially at the end of the tightening process.

What is understood by "wedge-shaped section" according to the invention is a section of a supporting disk that has one or more wedge-shaped elements. The wedge-shaped element or elements can be wedge-shape protuberances on the supporting disk or wedge-shaped recesses in the supporting disk. The term "recess" is not to be limited to material being removed from the supporting disk, but the term also includes recesses being produced by other manufacturing techniques such as casting.

In reasonable fashion, the wedge-shaped section of the first supporting disk and the wedge-shaped section of the second supporting disk have wedge-shaped elements that are adjusted to each other, i.e. the wedge-shaped elements that are moved over each other have the same wedge thickness inclination, and, advantageously, the same wedge thickness and length and the same length course, with the wedge thicknesses increasing in the opposite direction when the wedge-shaped elements are arranged over each other.

In one preferred embodiment, the head contact surface is in contact with the second supporting disk. This makes it possible for the attachment device to have a compact design. With this, it is not necessary to attach further components or elements such as a contact bond for the second supporting disk between the second supporting disk and the head contact surface. This embodiment is beneficial in that the clamping forces that act on the second supporting disk are directly passed on into the head.

In one preferred embodiment, the second supporting disk has a recess. With this, the head of the fastener is arranged at least partially in the recess. In this way, a compact and space-saving arrangement can be assured, and the head can be prevented from projecting out over the first supporting disk, or at least this can be reduced. Likewise, such an embodiment permits the height of the supporting disk (extension in the direction of the longitudinal axis of the pin) to be increased, so that a circumferential surface is created on which a tool can get an especially good grip.

In one preferred embodiment, the second supporting disk has a hexagonal outer contour. By this means it is possible to use a standard suitable tool such as a wrench for screw connections for tightening the supporting disk. Such a tool is found in many assembly halls and production shops.

A second version of the invention, in which a second supporting disk is dispensable, makes provision that the head contact surface is in contact with the wedge-shaped section of a supporting disk, and the head contact surface moves along the surface of the wedge-shaped section, when the supporting disk and the fastener turn relative to each other along the longitudinal axis of the pin. With this, the distance between the head contact surface and the surface of the supporting disk facing the pin end is increased, and by this means the distance between the supporting disk and the contact surface is reduced. The connecting pieces are arranged between the supporting disk and the contact surface, so that reducing the distance between the supporting disk and the contact surface increases the connection force exerted on the connecting pieces.

In one preferred embodiment of the second version of the invention, provision is made that the supporting disk is provided to be turned relative to the fastener about the longitudinal axis of the pin, while the fastener is not provided to be turned about the longitudinal axis of the pin. Alternatively, it is also conceivable that the supporting disk is not provided to be turned about the longitudinal axis of the pin, while the fastener is provided to be turned about the longitudinal axis of the pin. Alternatively, it is also conceivable that the fastener and the supporting disk turn in opposite rotational directions.

In a further preferred embodiment of the second version of the invention, torque is introduced via the supporting disk. Here, in a preferred embodiment, the supporting disk to be turned is specially configured, for example having a hexagonal outer contour, into which a tool can engage. In an alternative embodiment of the second version of the invention, torque is introduced via the head, so that it turns with the pin provided on it relative to the supporting disk.

In a preferred embodiment of the second version of the invention, the head contact surface has a wedge-shaped section and the wedge-shaped section of the head contact surface is in contact with the wedge-shaped section of the supporting disk.

In a preferred embodiment form of the second version of the invention, the head contact surface and the longitudinal axis of the pin are aligned perpendicular to each other. Preferably the head contact surface consists of multiple partial surfaces which, especially preferred, lie in one plane. In an especially preferred embodiment of the second version of the invention, the head contact surface consists of two surface parts that have the same distance from the longitudinal axis and are offset by 180° from each other. Preferably the surface parts have the same shape, with a rectangular or square shape being preferred.

Preferably with this the surface parts each have a wedge-shaped element, with the wedge thickness of the wedge-shaped element of the first surface part increasing in one direction and the wedge thickness of the wedge-shaped element of the second surface part increasing in the opposite direction. Preferably this is a direction that is perpendicular to the longitudinal axis and perpendicular to a connection line between the surface parts, with the connection line preferably running through the midpoints of the surface parts and through the longitudinal axis.

One head contact surface thus configured is especially well suited to be moved over a wedge-shaped section of the supporting disk, if the wedge-shaped section of the supporting disk is configured so that it consists of two wedge-shaped elements which extend over a ring segment, with the wedge thicknesses of the wedge-shaped elements increasing evenly clockwise in the circumferential direction and preferably the ring segments extending over a circular arc with a central angle of about 180°.

The expression "the head contact surface has a wedge-shaped section part" includes not only embodiments in which the head contact surface has wedge-shaped section parts, but also embodiments in which the head contact surface has a slanted run, with slanted run especially meaning that the head contact surface (or its surface parts) runs at an incline to the horizontal, if the fastener is arranged so that the longitudinal axis of the pin runs vertically. The inclined head contact surface or the inclined surface parts of the head contact surface correspond in a functional regard to the surfaces of wedge-shaped elements that are provided to be in contact with the wedge-shaped section of the supporting disk during relative motion between the head contact surface and the supporting disk.

An embodiment is also conceivable in which the wedge-shaped section of the head contact surface is formed by a recess, especially a groove, in the head contact surface, which has a slanting base. The recess or groove is lower at one end than at the other end of its longitudinal extension.

In a preferred embodiment the one supporting disk, or with multiple supporting disks arranged next to each other, the supporting disk situated farthest from the head, has at least one projection, which prevents the supporting disk from turning in a rotational direction relative to a flat surface.

Preferably it is the rotational direction of the second supporting disk, when the second supporting disk turns relative to the first supporting disk, to increase the distance between the surfaces of supporting disks pointing away from each other. The projection prevents the first supporting disk from turning in the same rotational direction as the second supporting disk and thereby increasing the distance between the supporting disks.

With the version of the invention in which the head contact surface moves along the surface of the wedge-shaped section of the supporting disk, preferably the rotational direction is the rotational direction of the fastener, when the fastener and the supporting disk move relative to each other to increase the distance between the head contact surface and the surface of the supporting disk facing the pin end.

For example, the projection can be configured to have a toothed shape and to hook or engage into the flat surface. Preferred is a plurality of projections. In especially preferred fashion, the projection or projections is attached to the circumference of the (first) supporting disk.

Especially as a flat surface a connection part is considered, on which the supporting disk is arranged and with which the supporting disk is in contact.

In a preferred embodiment, the wedge-shaped section extends over a ring segment, with the wedge thickness increasing in the circumferential direction. The ring segment can extend over a circular arc with a central angle between 0 and 360°. Preferably the supporting disk has multiple wedge-shaped sections, which, especially preferred, are evenly distributed in the circumferential direction and have the same measure, either with the wedge thicknesses of all wedge-shaped elements increasing evenly in the clockwise direction or the wedge thicknesses of all wedge-shaped elements decreasing evenly in the clockwise direction. In an especially preferred embodiment, the supporting disk has two wedge-shaped sections which extend over a circular arc with a central angle from 160 to 180°. In an alternative embodiment, the wedge-shaped section extends so that in a top-down view it has the form of the letters L or U, for example with the flat end on the short end of the L, or on one end of the U, and the elevated end on the long end of the L, or on the other end of the U.

With the wedge-shaped sections used as part of the invention, provision is made in an especially preferred embodiment that the surface of the wedge (the slanting surface) increases evenly. However, embodiments are also conceivable in which the surface of the wedge runs only at a slant in envelope fashion, or only runs at a slant in the fashion of an averaged course of a flat surface depicting the surface, assumed to be exact but configured to undulate. Likewise, combinations of these embodiments are conceivable in which the wedge-shaped section has sections in which the surface (the slanted surface) rises uniformly while it undulates in other sections, and is configured to slant only over an averaged course.

In an advantageous embodiment the one supporting disk, or with multiple supporting disks arranged next to each other, the supporting disk arranged closest to the head, which is in contact with the head contact surface, has projections which engage into the head contact surface, to prevent rotation of the head relative to the supporting disk. In addition, or as an alternative embodiment, the supporting disk that is in contact with the head contact surface has recesses into which the projections of the head contact surface engage, to prevent rotation of the head relative to the supporting disk.

Through the connection thus made possible to prevent rotation between the head and the second supporting disk, the attachment process is so facilitated that it suffices merely to apply the torque necessary for connection either via the head or via the second supporting disk. If the head or the supporting disk must not turn, then with this embodiment it suffices either to secure the head or the second supporting disk against rotation. In addition, through engagement of projections and recesses, relative motion can be prevented, and thus a reverse lock to prevent the connection from loosening or detaching.

In the version of the invention in which the head contact surface must move along the surface of the wedge-shaped section of the supporting disk, to increase the distance between the head contact surface on the surface of the supporting disk facing toward the pin end, the projections and recesses of the reverse lock serve to keep the attachment device from becoming loose or detaching. Thus, only at the end of the attachment process, i.e. after the desired connection force on the connecting pieces has been applied, do the projections and recesses prevent the head from being able to rotate relative to the supporting disk.

Preferably cams as projections and indentations as recesses are considered to be suitable counterparts for engagement with the cams. In especially preferred fashion, the cams are attached on the head contact surface and the indentations are either distributed over the second supporting disk in the circumferential direction or distributed on the surface of the wedge-shaped section of the supporting disk in the circumferential direction, with the cams and indentations having the same distance from the longitudinal axis of the pin. By this means, with nearly any relative turning position between the head contact surface and the (second) supporting disk, it can be ensured that the cams can engage into the indentations, through which it can be ensured that the attachment device is guaranteed against loosening or detachment, or through which a form-locking, rotationally stable connection is ensured between the head contact surface and second supporting disk.

In an alternative embodiment, the cams are either distributed over the second supporting disk in the circumferential direction or distributed over the surface of the wedge-shaped section of the supporting disk in the circumferential direction, and the indentations are made in the head contact surface.

Alternatively, the use of elastic elements as projections is also conceivable, with the elastic elements yielding in a rotational direction during turning, and getting out of engagement with the recesses, and conversely the elastic elements hook into the recesses during turning in the opposite rotational direction. In this way an (undesired) rotational motion in one direction can be prevented. Embodiments are also possible as alternatives in which recesses are not necessary to adjust a reverse lock or connection secure from turning. With this, projections of a supporting disk, for example, in the type of followers having a head with no recesses turn along with the supporting disk or prevent them as locking pieces from a relative turning.

In an advantageous embodiment, the pin of the fastener has a square cross section and the opening in the first supporting disk has a square cross section that prevents the first supporting disk from turning relative to the pin. This makes a form locking possible between the pin and the first supporting disk. This can be achieved in particular in that the diagonal of the square cross section of the pin is larger than one side of the square cross section of the opening in the first supporting disk. True, other cross-sectional shapes are also conceivable such as triangular, rectangular or polygonal cross sections.

Through the connection so as not to turn made possible between the pin (and thus the head) and the first supporting disk, the attachment process is facilitated to the point where it suffices merely to introduce sufficient torque for the attachment either via the head or via the first supporting disk. If the head and the supporting disk must not turn, then with this it suffices to secure either the head or the first supporting disk against rotation.

In an especially preferred embodiment, the contact surface is configured on a spring-loaded element, with the spring force pre-loading the element away from the longitudinal axis of the pin. In especially advantageous form this embodiment works if the contact surface has a greater distance from the longitudinal axis than the edges of the connection borings or connection holes. With this the pin can be inserted into the connection borings or connection holes, with the spring-loaded elements being forced in a direction pointing to the longitudinal axis of the pin. If, in the during further insertion of the pin, the spring-loaded elements come out of the connection borings or connection holes, the spring-loaded elements spring back, through which the connecting pieces between the supporting disk closest to the pin end and the contact surface are locked.

The spring-loaded element can consist of one or more sections. In advantageous fashion, sections of the spring-loaded element are distributed uniformly over the outer pin contour. For example, two sections are attached, displaced by 180° on the outer pin contour. A portion of the contact surface is configured on each section of the contact surface. Thus, the contact surface can consist of multiple segments.

The attachment device is particularly well suited for connection of two elements with both elements arranged between the (first) supporting disk and the contact surface. What is understood by elements especially are connecting parts, i.e., parts that are provided to be connected with each other, such as two plates. Especially advantageous is the use of the invention-specific connection means in the automobile industry, because particularly high value is placed there on quality, reliability and time-efficient production times. Due to adjustability of the connection force, which is rigidly preset in generic attachment devices known from prior art, the invention-specific attachment device offers various options for usage. Examples of areas of usage are attachment of inner and outer panelings on vehicle bodies or the attachment of air bags in vehicles. The assembly is done quickly, and, due to the contact surface formed on a spring-loaded element, from only one side. It does not need to be as with a through-screw connection where assembly personnel need sufficiently roomy access to the opposite side, for example, to provide a pin end with a screwed nut. The attachment device, which unlike screwed connections, the components of which as a rule consist of steel, can also be of lighter material such as plastic, which can in addition contribute to weight reduction.

However, the invention-specific attachment device is also especially well-suited for connecting three or more elements. Additional areas of industry and realms of application in which the advantages of the invention come to bear especially well are for example mechanical engineering, the energy industry, motor vehicle manufacture or agriculture.

BRIEF DESCRIPTION OF THE SEVERAL VIEWS OF THE DRAWINGS

The invention is explained in what follows in greater detail using the following figures, which show merely exemplary and advantageous embodiments of the invention. Shown are.

DETAILED DESCRIPTION OF THE INVENTION

Figure 1:
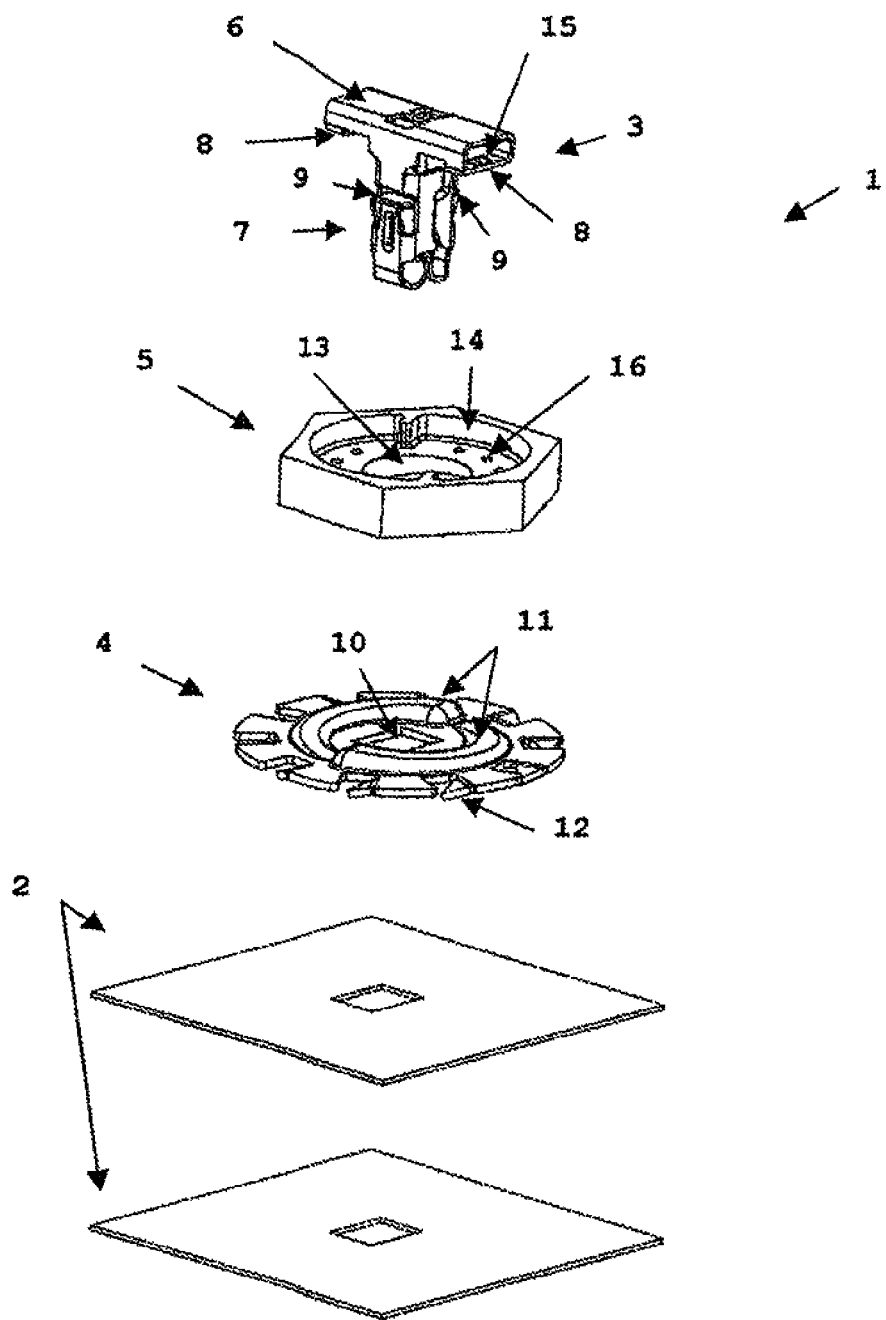
FIG. 1: an exploded view of an embodiment of the invention-specific attachment device for connection of two plates (first version of the invention)

FIG. 1 shows an attachment device 1, which is provided to connect two plates 2 with each other. The attachment device has a fastener 3, a first supporting disk 4 and a second supporting disk 5.

The fastener has a head 6 and a pin 7. The head 6 has a head contact surface 8 consisting of two surface parts. On pin 7 a contact surface 9 consisting of two segments is attached, that is opposite to head contact surface 8, with the segments formed on spring-loaded elements so that the segments of contact surface 9 can be compressed in a direction pointing to the longitudinal axis of pin 7. Within the context of the specification of the invention, the term "opposite" also includes such arrangements as shown with the fastener of 1, in which the segments of contact surface 9 are turned by 90° about the longitudinal axis of pin 7 relative to the surface parts of head contact surface 8. It does not depend on the segments of contact surface 9 being directly opposite the surface parts of head contact surface 8. The segments of the contact surface can also only be lying in a plane that is essentially parallel to the plane in which those—as per the embodiment of 1, running perpendicular to the longitudinal axis of pin 7—of the head contact surface 8 lie, in order to meet the requirement of "opposite."

The first supporting plate 4 has an opening 10 for insertion of pin 7. Opening 10 is square, and through form-locking it thus prevents pin 7, which essentially also has a square cross section, from being able to turn relative to first supporting disk 4. Additionally, first supporting disk 4 has two wedge-shaped sections 11, the wedge thicknesses of which increase clockwise in the circumferential direction. The wedge-shaped elements extend over a ring segment with a central angle of about 180°. Additionally, first supporting disk 4 has tooth-shaped projections 12.

Second supporting disk 5 has an opening 13 to allow pin 7 to pass through and to make possible a turning of second supporting disk 5 relative to pin 7. Additionally, second supporting disk 5 has a recess 14, which is provided so that the head 6 is at least partially arranged in recess 14. On the underside of second supporting disk 5 are two wedge-shaped sections (not shown), the wedge thicknesses of which increase counterclockwise in the circumferential direction. The wedge-shaped elements likewise extend over a ring segment with a central angle of about 180°.

Figure 2:
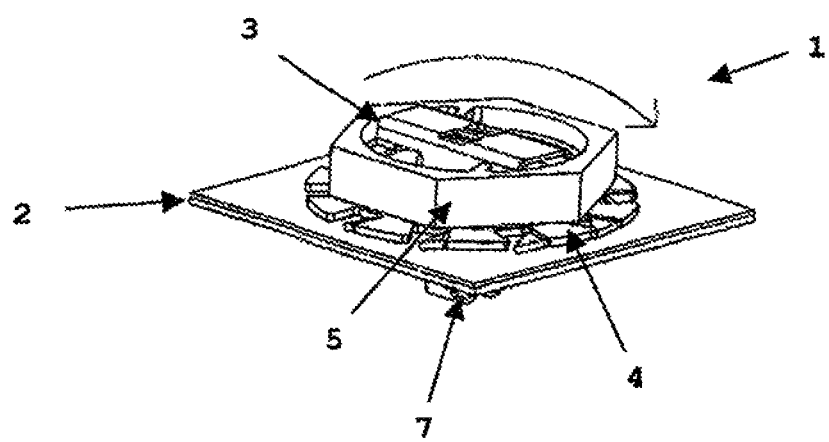
FIG. 2: an assembled version of the embodiment depicted in FIG. 1 in a perspective view

FIG. 2 shows the assembled state of the components from FIG. 1. Here first, pin 7 is inserted through second supporting disk 5, then through first supporting disk 4 and finally through the plates 2. With penetration of contact surface 9 through first supporting disk 4 and through plate 2, the segments of contact surface 9, due to the spring-loaded elements, are compressed in a direction pointing to the longitudinal axis of pin 7, and after passing the openings have again moved back into the original position, so that pin 7 is prevented from being able to be pulled again through the openings. The supporting disks and the plates are thus arranged between contact surface 9 and head contact surface 8, which is in contact with second supporting disk 5.

Through tightening of second supporting disk 5 (indicated by the curved arrow), it turns relative to pin 7 and to first supporting disk 4, wherein first supporting disk 4, especially due to the tooth-shaped projections 12, does not turn with second supporting disk 5 and thus also does not turn relative to the plates above. With the relative rotation between the supporting disks, the wedge-shaped section of second supporting disk 5 moves over wedge-shaped section 11 of first supporting disk 4, through which the distance between the surfaces of the supporting disks pointing away from each other is increased, and thereby the distance between first supporting disk 4 and contact surface 9 is reduced. Since the plates 2 are arranged between first supporting disk 4 and contact surface 9, the connecting force exerted on the plates 2 is thereby increased, with them thereby being securely attached to each other.

Figure 3:
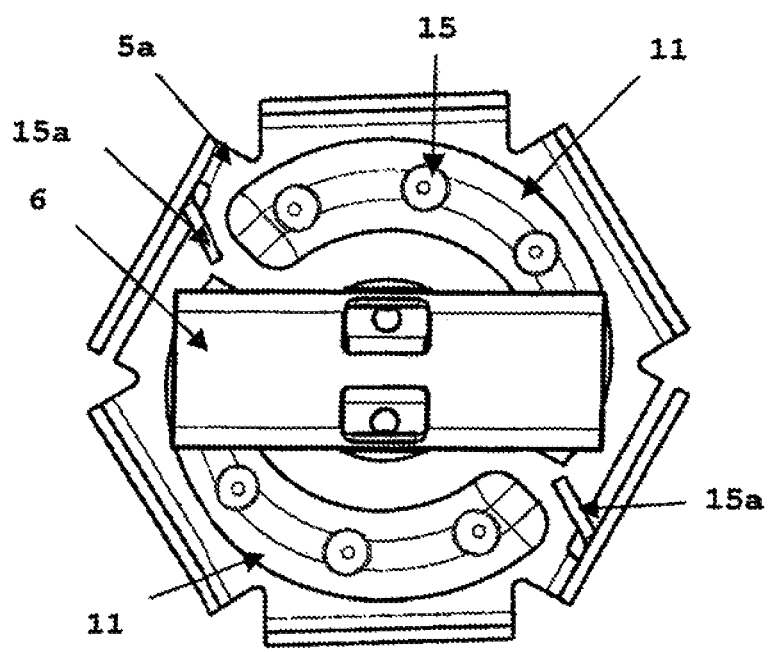
FIG. 3: an embodiment of the second version of the invention in a plan view from above FIG. 4 $a$), $b$) $c$): an embodiment of the fastener in a second version of the invention in a side view (FIG. 4$a$)), a front view (FIG. 4$b$)), and in a perspective view (FIG. 4$c$))
Figure 4:
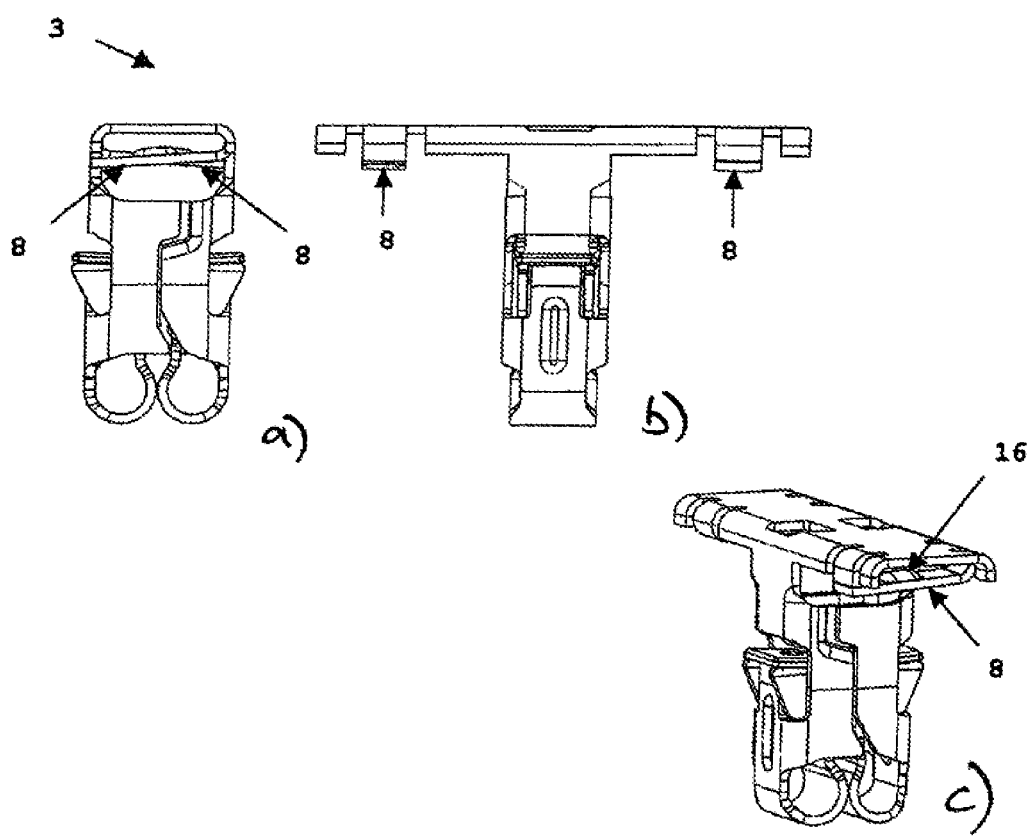

FIG. 3 shows an exemplary embodiment of a second version of the invention. In contrast to the first version, here an increase in distance occurs between head contact surface 8 and the surface of the only one supporting disk 5a facing the pin end. With this, with the relative motion between head contact surface 8 and supporting disk 5a, head contact surface 8 and wedge-shaped section 11 of supporting disk 5a are in contact. The three illustrations in FIG. 4 show various views of an especially advantageous embodiment of fastener 3, which has a head contact surface 8 consisting of two surface parts. The surface is slanted, so that they are suited for being moved over the wedge-shaped section 11 of supporting disk 5a from FIG. 3. As is evident in FIG. 3, the surfaces of wedge-shaped elements 11 have projections 15 in the form of cams, which are evenly distributed in the circumferential direction. These can engage into recesses 16 in the form of cavities that are made in surface parts 8 (see FIG. 4). By this means, during tightening, at nearly any relative turning position between head contact surface 8 and supporting disk 5a, it can be ensured that cams 15 of wedge-shaped elements 11 can engage into recesses 16 of surface parts 8, ensuring a reverse lock of attachment device 1 against loosening or detachment. The same kind of reverse lock is likewise suited to secure the attachment device of the first version of the invention (for this, see reference symbols 15 and 16 in FIG. 1).

A further reverse lock is ensured by the elastic projections 15a: these are positioned and aligned on the supporting disk in such a way that with the relative motion, caused by tightening, between supporting disk 5a and head 6, the projections 15a undergo elastic yielding and are passed by head 6, while in contrast, a relative motion in the opposite direction is blocked by projections 15a.

Figure 5:
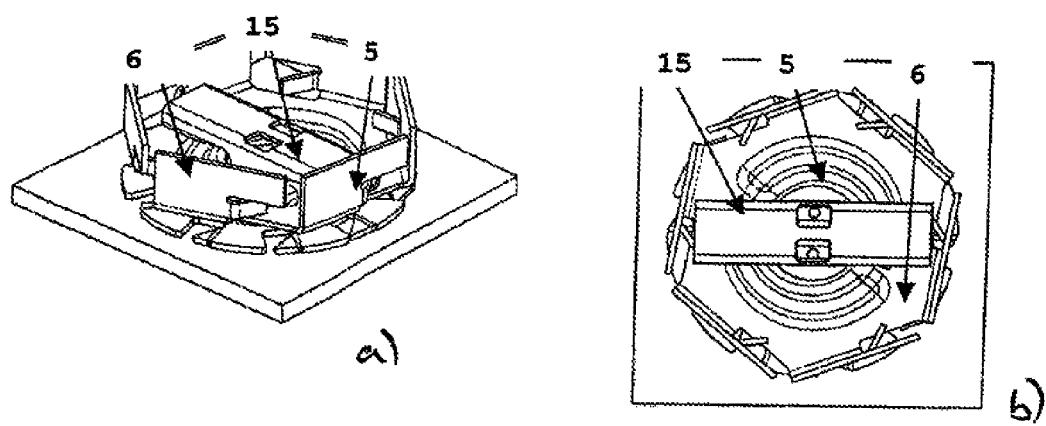
FIG. 5 $a$), $b$): another embodiment of the first version of the invention with another embodiment for a reverse lock in a perspective view (FIG. 5$a$)) and a plan view from above (FIG. 5$b$))

FIG. 5 again shows a perspective view (on the left) of projections 15, as they are shown in FIG. 3 in the plan view. In the exemplary embodiment as per FIG. 5, they serve as a reverse lock between second supporting disk 5 and head 6 (first version of the invention).

Figure 6:
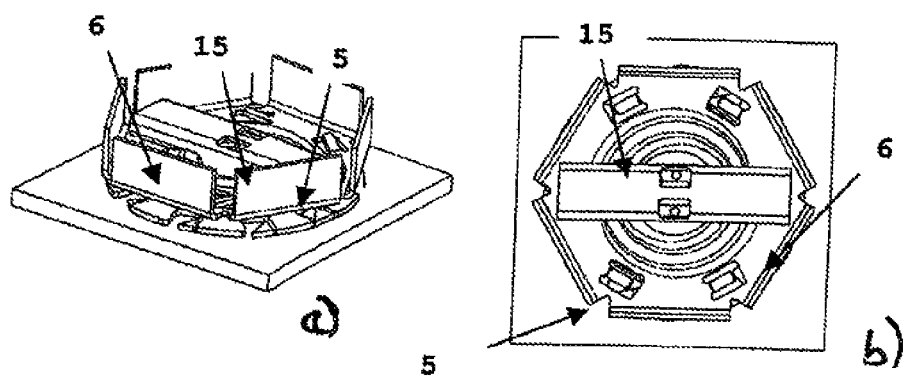
FIG. 6 $a$), $b$): another embodiment of the first version of the invention with another embodiment for a reverse lock in a perspective view (FIG. 6$a$)) and a plan view from above (FIG. 6$b$))

FIG. 6 shows another embodiment of a reverse lock. In this, an embodiment as per the first version of the invention is shown, with the reverse lock shown also to be suited for the second version of the invention. In the embodiment, second supporting disk 5 is provided to turn clockwise relative to head 6. With this, elastic projections 15 pass head 6, with these being compressed downward, and after the head 6 passes they move back again into the original position. By this means, a loosening or detaching relative motion in the opposite direction is prevented.

Figure 7:
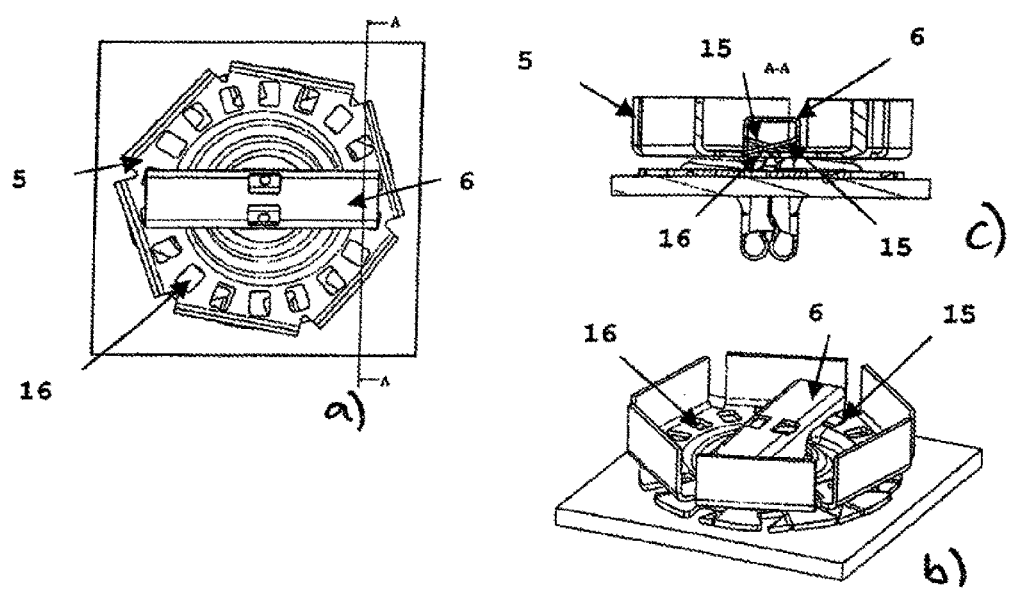
FIG. 7 $a$), $b$), $c$): another embodiment of the first version of the invention with another embodiment for a reverse lock in a perspective view (FIG. 7$a$)) and a plan view from above (FIG. 7$b$)) and a sectional view as per the section line A-A in FIG. 7$a$)) (FIG. 7$c$)).

FIG. 7 shows another exemplary embodiment of a reverse lock for the first version of the invention, with this type of reverse lock also being suitable for the second version of the invention. The left figure shows a plan view of attachment device 1. The upper right figure shows a sectional view as per section A of the left figure. The lower right figure shows a perspective view of the attachment device.

The left figure shows a plurality of recesses 16 in the form of openings in second supporting disk 5. The openings 16 are uniformly distributed in the circumferential direction. In the upper left sectional view, at both ends of head 6 on the surface parts of head contact surface 8, attached projections are recognizable, which are elastically deformable and in an unloaded state can engage into the openings 16.

In this exemplary embodiment, second supporting disk 5 is turned clockwise to attain an attachment of the device. With this, a relative motion between second supporting disk 5 and head 6 occurs, in which the openings 16 pass the projections 15. If an opening 16 moves over a projection 15, then projection 15 engages into opening 16. If turning motion continues, then elastic projection 15 is then pushed out of opening 16, and is only unloaded and moved back with this opening 16 when positioned over an adjoining opening 16. When effort is exerted to make a relative motion in the opposite direction, the projections 15 hook into openings 16, thus assuring a reverse lock.

The invention claimed is:
1. An attachment device with a fastener which has
a head with a head contact surface; and
a pin extending out from the head along a longitudinal axis,
wherein the pin has an attachment end with a contact surface that is opposite the head contact surface,
characterized by a first supporting disk and a second supporting disk, wherein
the first supporting disk has a suitably large opening to permit the pin to pass through the opening, and the first supporting disk has a wedge-shaped section;
the second supporting disk has a suitably large opening to allow the pin to pass through the opening and to permit a turning of the second supporting disk relative to the fastener about the longitudinal axis of the pin,
wherein the second supporting disk is in contact with the wedge-shaped section and moves along the surface of the wedge-shaped section, when the second supporting disk and the fastener turn relative to each other about the longitudinal axis of the pin.
2. The attachment device of claim 1, characterized in that the second supporting disk has a wedge-shaped section and the wedge-shaped section of the second supporting disk is in contact with the wedge-shaped section of the first supporting disk.

3. The attachment device of claim 1, characterized in that the head contact surface is in contact with the second supporting disk.

4. The attachment device of claim 1, characterized in that the second supporting disk has a recess and that the head of the fastener is arranged at least partially in the recess.

5. The attachment device of claim 1, characterized in that the second supporting disk has a hexagonal outer contour.

6. An attachment device with a fastener which has
a head with a head contact surface; and
a pin extending out from the head along a longitudinal axis,
wherein the pin has an attachment end with a contact surface that is opposite the head contact surface;
characterized by a supporting disk, wherein
the supporting disk has a suitably large opening to permit the pin to pass through the opening and to permit a turning of the supporting disk relative to the fastener about the longitudinal axis of the pin,
the supporting disk having wedge-shaped section,
wherein the head contact surface is in contact with the wedge-shaped section and moves along the surface of the wedge-shaped section when the supporting disk and the fastener turn relative to each other around the longitudinal axis of the pin.

7. The attachment device of claim 6, characterized in that the head contact surface has a wedge-shaped section and the wedge-shaped section is in contact with the wedge-shaped section of the supporting disk.

8. The attachment device of claim 1, characterized in that the supporting disk, or, with multiple supporting disks arranged next to each other, the supporting disk that is farthest from the head, has at least on projection which prevents the supporting disk from turning in a rotational direction relative to a flat surface.

9. The attachment device of claim 1, characterized in that the wedge-shaped section extends over a ring segment, wherein the wedge thickness increases in the circumferential direction.

10. The attachment device of claim 1, characterized in that the one supporting disk, or with multiple supporting disks arranged next to each other, the supporting disk arranged closest to the head is in contact with the head contact surface and has projections that engage into recesses in the head contact surface, to prevent rotation of the head relative to the supporting disk, and/or that the one disk, or with multiple supporting disks arranged next to each other, the supporting disk that is closest to the head, is in contact with the head contact surface and has recesses into which the projections in the head contact surface engage to prevent rotation of the head relative to the supporting disk.

11. The attachment device of claim 1, characterized in that pin of the fastener has a square cross section and that the opening in the first supporting disk has a square cross section which prevents the first supporting disk from turning relative to the pin.

12. The attachment device of claim 1, characterized in that the contact surface is formed on a spring-loaded element, with the spring force pre-tensioning the element away from the longitudinal axis of the pin.

13. A method for attaching two or more elements comprising:
forming an attachment device having a fastener, said fastener having a head with a head contact surface and a pin extending out from said head along a longitudinal axis, wherein said pin has an attachment end with a contact surface that is opposite the head contact surface, the fastener being characterized by a first supporting disk and a second supporting disk, wherein said first supporting disk has a suitably large opening to permit said pin to pass through said opening, and said first supporting disk has a wedge-shaped section, said second supporting disk having a suitably large opening to allow said pin to pass through said opening and to permit a turning of said second supporting disk relative to the fastener about the longitudinal axis of said pin, wherein said second supporting disk is in contact with said wedge-shaped section and moves along the surface of said wedge-shaped section when said second supporting disk and said fastener turn relative to each other about the longitudinal axis of said pin;
placing the elements between said first supporting disk and said contact surface; and
attaching the elements with the fastener.

14. The method for attaching two or more elements of claim 13, wherein the pin of the fastener has a square cross section and that at least one of the two elements has an opening through which the pin can pass, and that the opening has a square cross section which prevents the pin from turning relative to the element with the opening.

15. The method for attaching two or more elements of claim 13, wherein said second supporting disk has a wedge-shaped section and said wedge-shaped section of said second supporting disk is in contact with said wedge-shaped section of said first supporting disk.

16. The method for attaching two or more elements of claim 13, wherein said head contact surface is in contact with said second supporting disk.

17. The method for attaching two or more elements of claim 13, wherein said second supporting disk has a recess and that said head of the fastener is arranged at least partially in said recess.

18. The method for attaching two or more elements of claim 13, wherein said second supporting disk has a hexagonal outer contour.

19. The attachment device of claim 2, characterized in that said head contact surface is in contact with said second supporting disk.

20. The attachment device of claim 3, characterized in that said second supporting disk has a recess and that said head of said fastener is arranged at least partially in said recess.

* * * * *